US008554795B2

(12) United States Patent
Plüss et al.

(10) Patent No.: US 8,554,795 B2
(45) Date of Patent: Oct. 8, 2013

(54) METHOD FOR WRITING DATA AND APPLICATIONS INTO IDENTIFICATION MEDIA

(75) Inventors: Marcel Plüss, Tann (CH); Peter Plüss, Dürnten (CH); Klaus Ulrich Klosa, Grüningen (CH)

(73) Assignee: Legic Identsystems AG (CH)

( * ) Notice: Subject to any disclaimer, the term of this patent is extended or adjusted under 35 U.S.C. 154(b) by 22 days.

(21) Appl. No.: 10/578,217

(22) PCT Filed: Nov. 11, 2004

(86) PCT No.: PCT/CH2004/000684
§ 371 (c)(1),
(2), (4) Date: Jun. 20, 2006

(87) PCT Pub. No.: WO2005/048203
PCT Pub. Date: May 26, 2005

(65) Prior Publication Data
US 2007/0112770 A1    May 17, 2007

(30) Foreign Application Priority Data
Nov. 12, 2003 (CH) ........................ 1946/03

(51) Int. Cl.
*G06F 17/30* (2006.01)
(52) U.S. Cl.
USPC ............................ 707/790; 707/822; 707/828
(58) Field of Classification Search
None
See application file for complete search history.

(56) References Cited

U.S. PATENT DOCUMENTS

| 4,827,512 | A | 5/1989 | Hirokawa et al. |
| 5,293,577 | A | 3/1994 | Hueske et al. |
| 5,452,431 | A | 9/1995 | Bournas et al. |
| 5,682,027 | A | 10/1997 | Bertina et al. |
| 6,126,078 | A * | 10/2000 | Locher et al. ............... 235/492 |
| 6,308,317 | B1 | 10/2001 | Wilkinson et al. |
| 6,378,068 | B1 * | 4/2002 | Foster et al. ..................... 713/1 |
| 6,698,654 | B1 * | 3/2004 | Zuppicich ..................... 235/380 |
| 2002/0089890 | A1 * | 7/2002 | Fibranz et al. ............ 365/230.03 |
| 2003/0037237 | A1 * | 2/2003 | Abgrall et al. ................ 713/166 |

(Continued)

FOREIGN PATENT DOCUMENTS

| EP | 0 218 176 A | 4/1987 |
| FR | 2 667 171 A | 3/1992 |

(Continued)

*Primary Examiner* — Son T Hoang
(74) *Attorney, Agent, or Firm* — Ostrolenk Faber LLP

(57) ABSTRACT

A method of writing data into identification media of various types (IM-X, IM-Y) via assigned write/read stations WR in accordance with an embodiment of the present application includes a step wherein, a virtual, identification media-independent reference file system RFS is defined. All access keys RKi are replaced by a file system key FSK and all access rights ACi of subsections Bi are suspended and a file system FS, corresponding to the reference file system RFS, is initialized or written into the identification media: (FS(IM-X), FS(IM-Y)). In doing so, a file system starting point (FS-S (IM-X), FS-S(IM-Y)) is defined in the identification media (IM(FS) and in the assigned read/write stations WR(RFS) so that applications (App(RFS) corresponding to the virtual reference file system RFS can be written into the identification media and executed. The method allows for the writing into or execution of generally defined applications (App(RFS) into initialized identification media of various types (IM-X(FS), IM-Y(FS)) without adapting them.

21 Claims, 7 Drawing Sheets

(56) References Cited

U.S. PATENT DOCUMENTS

| | | | |
|---|---|---|---|
| 2004/0024729 A1* | 2/2004 | Worley | 707/1 |
| 2004/0064673 A1* | 4/2004 | Rogers et al. | 711/207 |
| 2004/0122774 A1* | 6/2004 | Studd et al. | 705/65 |
| 2006/0101506 A1* | 5/2006 | Gallo et al. | 726/3 |

FOREIGN PATENT DOCUMENTS

| | | |
|---|---|---|
| WO | WO 97/34265 | 9/1997 |
| WO | WO 99/38131 A | 7/1999 |
| WO | WO 01/01258 A1 | 1/2001 |
| WO | WO 02/069285 * | 9/2002 |

* cited by examiner

METHOD FOR WRITING DATA AND APPLICATIONS INTO IDENTIFICATION MEDIA

CROSS REFERENCE TO RELATED APPLICATIONS

The present application is a 35 U.S.C. §§371 national phase conversion of PCT/CH2004/000684, filed Nov. 11, 2004, which claims priority of Swiss Application No. 1946/03, filed Nov. 12, 2003. The PCT International Application was published in the German language.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Disclosure

The invention relates to a method for writing a data organization or corresponding data assigned to a data organization, into identification media, according to the preamble of claim 1, as well as an identification medium with a data organization.

(2) Description of the Art

Standard identification media of different types, e.g. contactless identification media, chip cards or value cards etc. are known from various manufacturers, which are applied in a multitude of applications in access control applications and security applications, for example for the access to services and goods, access to protected areas and buildings, the access to data processing installations, time management, etc. Such identification media correspond to various industry standards and have various memory organizations. A standard identification medium is known e.g. from WO 01/01258 which specifies a method for access to a memory of identification media, wherein at least one access key and one access right must be defined for each application. These data memories have different memory sizes and several access keys in a key area, as well as access rights for part areas. Applications must be written according to this memory structure.

On the other hand, a system with special proprietary, contact-free identification media is known from WO 97/34265, whose structure corresponds to a hierarchical authorization system, so that several applications from different users may be written in their data memory, and wherein the hierarchical authorization system ensures that independent applications may be autonomously defined and executed by independent users, and wherein different independent applications may not mutually influence one another.

With these known systems, the identification medium (and its data organization or file system) must correspond to the special data organization of the applications or of the authorization system. For this however, one requires special proprietary identification media which are often significantly more expensive in comparison to standard identification media.

BRIEF SUMMARY

It is therefore the object of the present invention presented to overcome the previous limitations and disadvantages and to permit an access to memories of different types of (standard) identification media in a uniform way and manner, so that the definition and execution of applications is simplified, and their application possibilities are broadened.

According to the invention, this object is achieved by a method according to claim 1 and by an identification medium. The dependent patent claims relate to further developments of the invention with an extension of the possibilities for the design and execution of applications for different users.

BRIEF DESCRIPTION OF THE DRAWINGS

The invention is hereinafter explained in more details on the basis of figures and examples.

The figures show in.

DETAILED DESCRIPTION OF THE EMBODIMENTS

Figure 1:
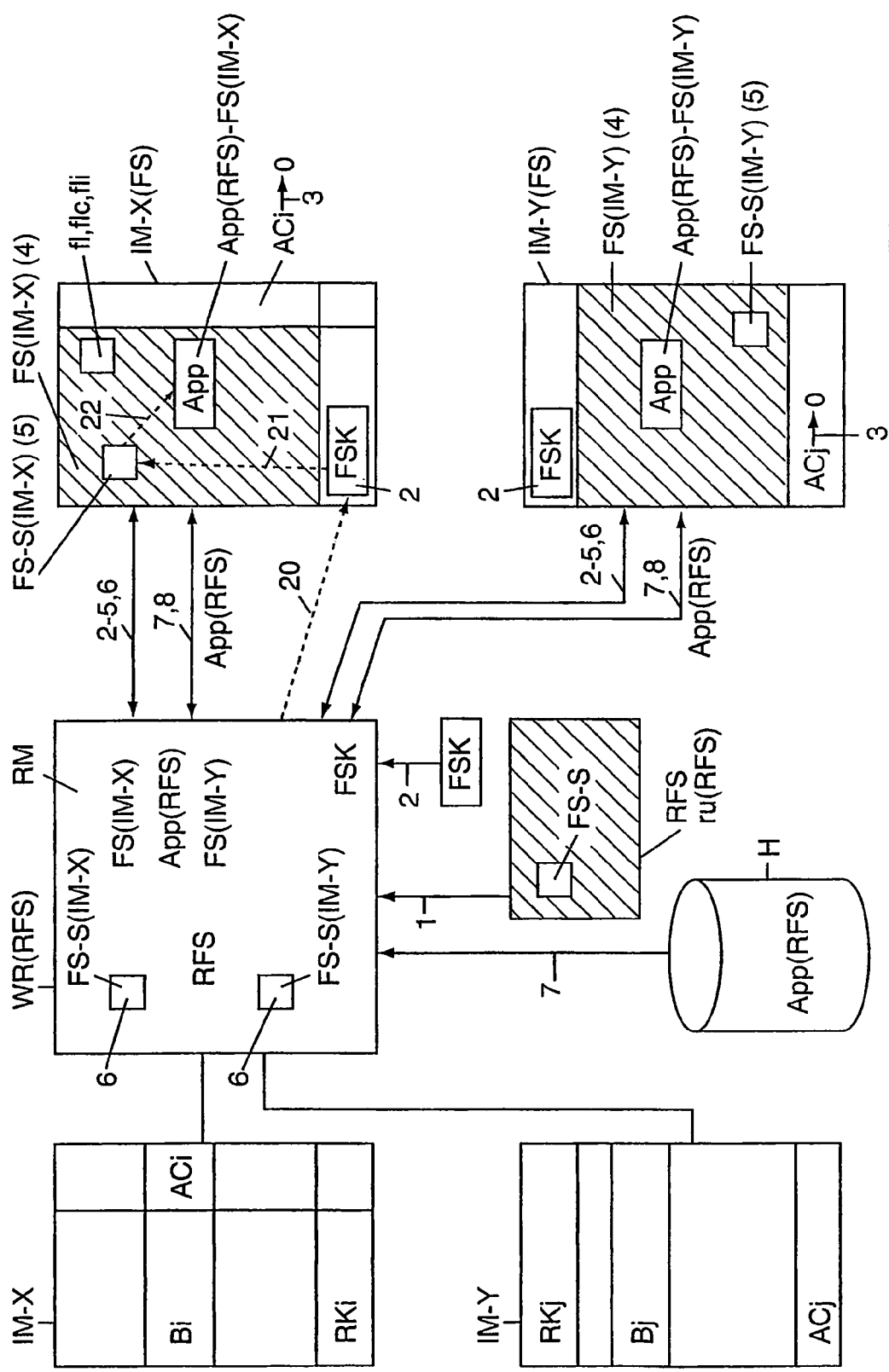
FIG. 1 the method according to the invention for writing a file system FS into identification media IM according to a reference file system RFS.

FIG. 1 (with the FIGS. 3a, 3b) illustrates the method according to the invention for writing data into, or for the data-writing of identification media of various types IM-X, IM-Y by means of assigned write/read stations WR, wherein the identification media comprise an application area App-Ar freely accessible to applications App, with various access keys RKi and access rights ACi, in each case for part areas Bi of the application area App-Ar, wherein a file system FS is written in or initialized which corresponds to a defined, virtual reference file system RFS (method step 1) itself being independent of identification means, wherein all access keys RKi are replaced by a file system key FSK (method step 2) and all access rights ACi of the part areas Bi are suspended (3) and subsequently the file system FS adapted to the identification media is written into these FS(IM-X), FS(IM-Y) (4) and thereby in each case a file system starting point FS-S(IM-X), FS-S(IM-Y) is defined in the identification media (IM)

FS) (5), said starting point likewise being defined (6) in the assigned write/read stations WR(RFS) adapted to the reference file system RFS, so that applications App(RFS) defined according to the virtual reference file system RFS may be written into (7) the identification media IM-X(FS), UM-Y (FS) via assigned write/read stations WR(RFS), and executed (8).

Preferably, rules ru(RFS) are assigned to the reference file system RFS, which stipulate the relationships between the different data of the reference file system.

Essential elements of this new method are the universal, virtual reference file system RFS independent of identification media, as well as the identification-media-dependent file system FS which in accordance with the universal virtual reference file system RFS is written into the real data memory of the identification media IM (standard identification media).

Stated briefly, with the method according to the invention, firstly the data memory of the standard identification medium is emptied, then the file system FS is written in an adapted manner, so that RFS-applications App-RFS may be written in and executed in an unchanged manner.

File system FS means: a system for the configuration, organization and management of data in certain data memories.

Reference File System RFS means: a virtual, abstract model of a file system (independent of real data memories) for the organization of data on a data carrier, so that this data is made available to a user for definition and execution of applications within the framework of a communication system.

The writing-in of data according to the method according to the invention means writing over physical memory addresses pAd which may be data-written once or several times, as well as the writing of data into unwritten physical memory addresses pAd which may be data-written once or several times.

Figure 3A:
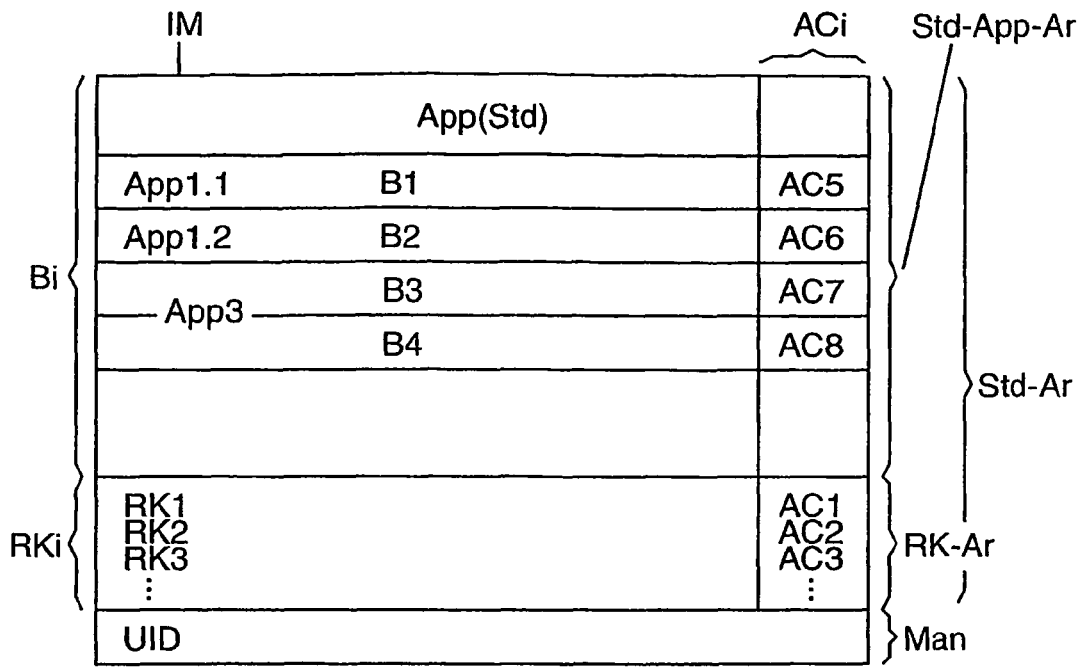

Thereby, FIG. 1 shows two different types X, Y of standard identification media IM-X, IM-Y with a different data organization, in each case of access keys RKi, RKj, of part areas Bi, Bj and access rights ACi, ACj (as is also represented in FIG. 3a). For this purpose, a virtual reference file system RFS, preferably with rules ru(RFS), is defined with a defined file system starting point FS-S(UM-X), FS-S(IM-Y) as well as with an assigned file system key FSK. The standard identification media IM-X, IM-Y, via an assigned write/read station WR(RFS) are initialized with the file system FS into identification media IM-X(FS), UM-Y(FS) by way of the method steps 1 to 5. Thereby, the file system key FSK as well as the file system starting points FS-S(IM-X), FS-S(IM-Y) and the file systems (FS(IM-X), FS(IM-Y) are written in according to the type X, Y of the identification media, and the access keys RKi, RKj are disabled or deleted, so that an access to the complete file system area FS is possible with the key FSK.

Subsequently applications App(RSF) corresponding to the reference file system RSF, e.g. from a host H, via the write/read station WR(RFS), may be written into the identification media as App(RSF)-FS(IM-X), App(RFS-FS(IM-Y) and executed in the method steps 6, 7, 8. FIG. 1 illustrates also that the file system FS may be realized in a different manner according to the type X, Y of the identification media, i.e. may be optimally adapted to the type and memory structure of the identification media. The access to an application thereby is effected via the file system key FSK (in method step 20), and the access to the application (in method step 22) via the file system starting point FS-S (method step 21).

Figure 2A:
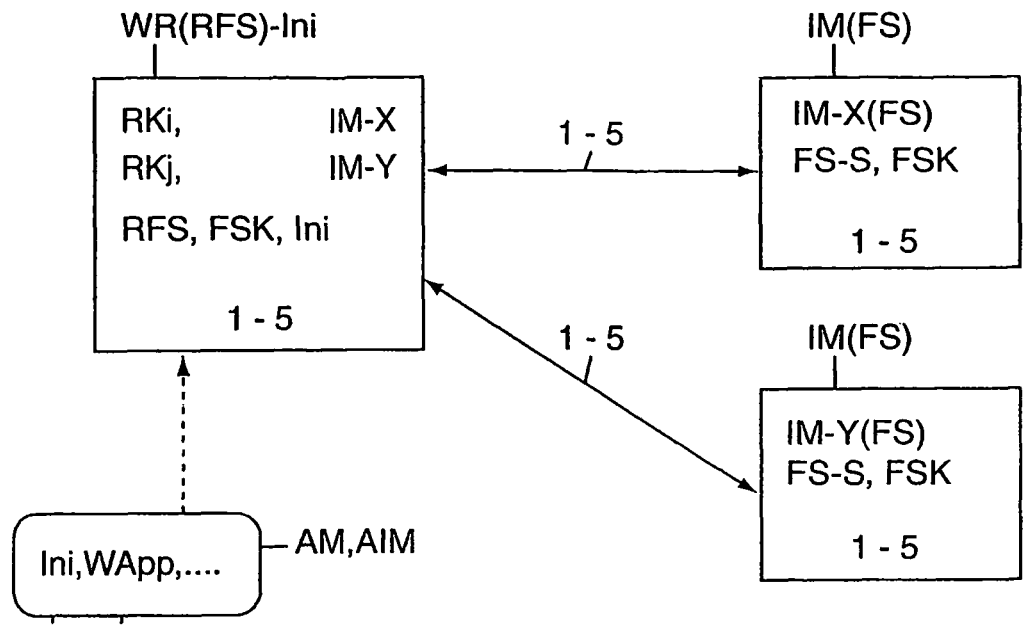
FIG. 2a-c illustrates the functions: initializing a file system FS, writing and executing an application App by way of assigned write/read stations WR(RFS), FIG. 3a a standard-identification medium IM with an application area according to the state of the art, FIG. 3b an identification medium IM(FS) according to the invention, with a file system FS and a file system key FSK, FIG. 4 an identification medium with a standard area Std-Ar and a file system area FS-Ar, FIG. 5 an identification medium IM(FS) with an authorization system A, FIG. 6 a determination of physical addresses pAd in the identification medium IM(FS) from virtual addresses vAd with respect to the reference file system RFS and the file system FS, FIG. 7 an installation (or a communication system) with a reference file system RFS and a host H, with corresponding assigned applications App(RFS), write/read stations WR(RFS) and identification media IM(FS), FIG. 8 a search and read function "auto read" AR.
Figure 2B:
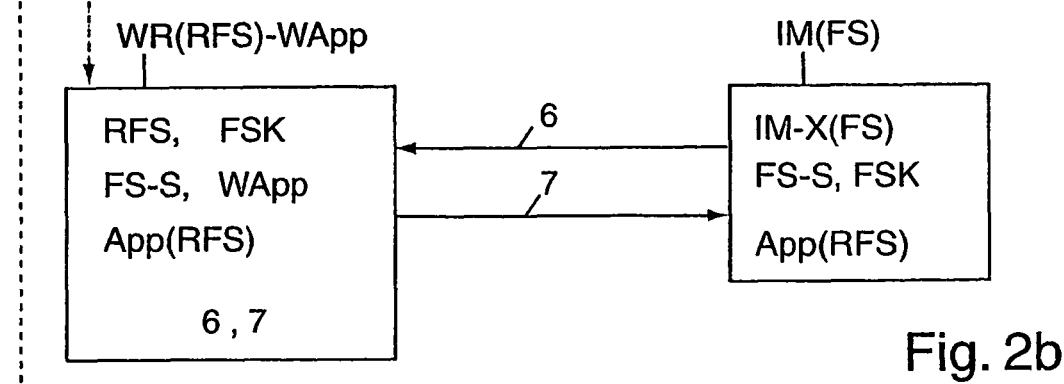
Figure 2C:
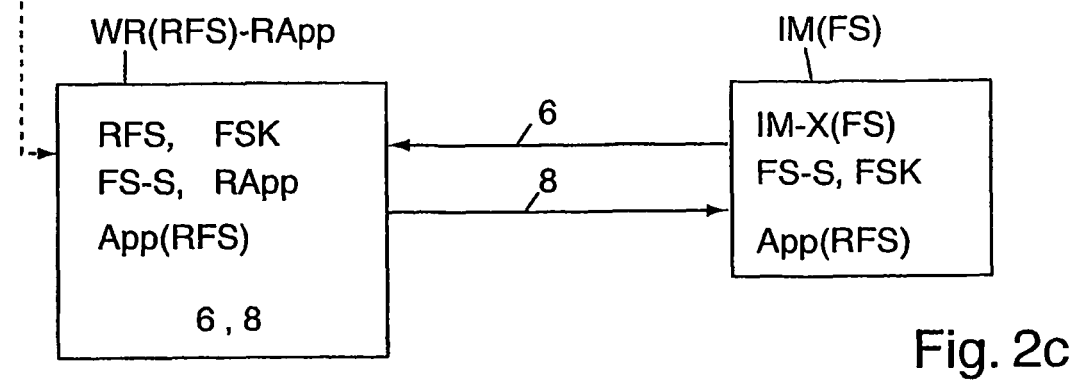

FIG. 2a-c, supplementary to FIG. 1, illustrate how one differentiates between three different functions of assigned write/read stations with the method according to the invention: initialization of a file system FS, writing-in of an application and execution of an application.

a) The initialization of the identification media IM by way of an assigned write/read station WR(RFS) corresponds to the method steps 1-5 (of FIG. 1). A precondition for this is a write/read station WR(RFS)-Ini with this function "initialize" Ini, which has knowledge of the type of identification media IM-X, IM-Y and their access key RKi, and which contains the reference file system RFS and the file system key FSK. The initialized identification media IM-X (FS), IM-Y(FS) with the file system starting points FS-S(IM-X), FS-S(IM-Y) result from this.

b) The subsequent writing-in of an application App(RFS) requires a write/read station WR(RFS)-WApp with a function "writing-in" WApp-corresponding to the method step 7. The precondition for this is again the knowledge of FSK and FS-S (according to method step 6) as well as the application App(RFS). An identification medium IM(FS) with the application App(RFS) results from this.

c) The execution of an application App(RFS) requires a write/read station WR(RFS)-RApp with a function "execute" Rapp, corresponding to the method step 8.

The assigned write/read stations WR(RFS) may thus be provided with the required functions initialize (Ini), writing-in (WApp) and/or execute (RApp) according to their intended task.

The initialization of all identification media of a complete system of a system owner may in principle be limited to only one initialization write/read station WR(RFS)-Ini. This function Ini corresponds to an uppermost hierarchical level.

The function "writing-in" WApp of applications may be introduced or initialized into the corresponding write/read stations WR(RFS)-WApp on a hierarchical level lying below this, e.g. by way of independent users SSC in each case for their independent applications App.

And the function "execute" Rapp of an application may in turn be introduced on a lower hierarchical level.

In practice, write/read stations WR with the function writing-in mostly also contain the corresponding function of execution of an application.

The initialization and introduction or release of these functions Ini, WApp and RApp into the write/read stations WR(RFS) may also be realized and also changed by way of suitable authorization means AM or authorization media AIM, i.e. by way of suitable hardware or software (Code).

The access to the file system FS is preferably effected via the file system starting point FS-S.

The file system starting point FS-S(IM-X), FS-S(IM-Y) may be determined from the assigned write/read stations WR(RFS) by way of the recognition of the type (X, Y) of the identification medium, e.g. in the framework of the communication by way of the evaluation (analysis) of the unique identification number UID, and thus defined (method step 6), in the case that it is not yet known, for the execution of applications.

A great advantage of the method according to the invention lies in the fact that an application App(RFS) defined in accordance with the specifications of the reference file system RFS may be written into any initialized standard identification medium IM(FS) which contains the file system FS, without adaptation.

Thus a background system/host or a write/read station WR(RFS) may thus also execute an application App(RFS)

defined in such a way on any initialized identification media IM(FS) without adaptation to the identification media.

Figure 3B:
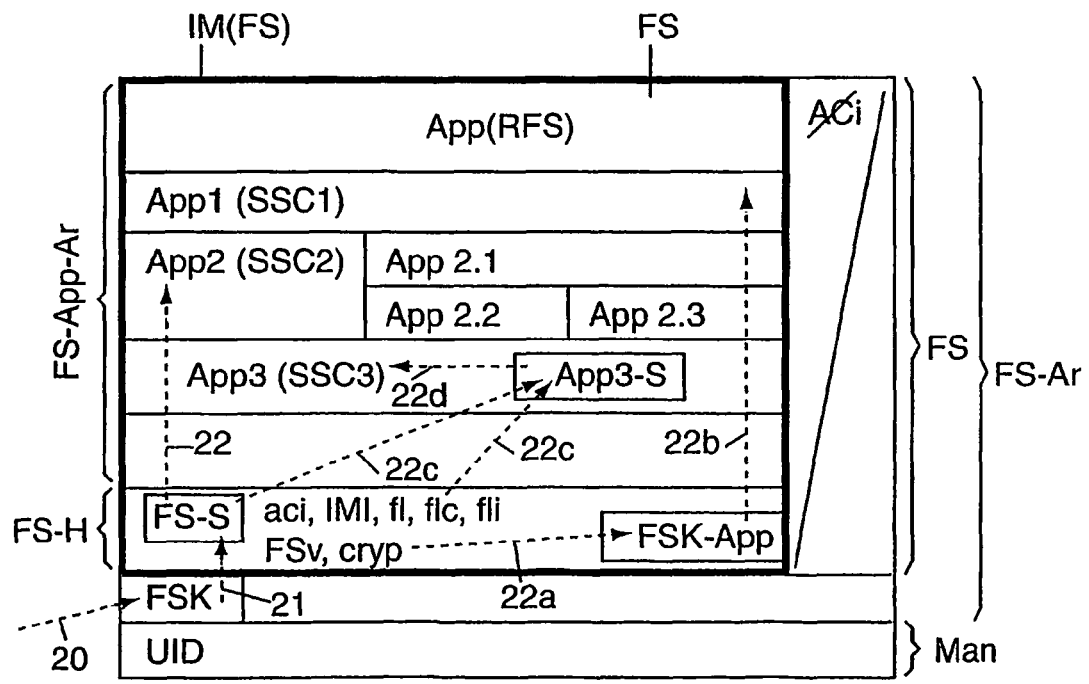

FIG. 3a shows a standard identification medium IM, which is transformed into an identification medium IM(FS) initialized according to the invention,—according to FIG. 3b. The standard identification medium IM according to FIG. 3a comprises a fixed, given manufacturer's area Man with a unique identification number UID, and as the case may be, further manufacturer's data, e.g. memory size and further details—as well as a standard area Std-Ar.

The standard area consists of an access key area RK-Ar with access keys RKi and of a standard application area Std-App-Ar with part areas Bi and applications Appi, which in each case include access rights ACi.

The initialized identification medium IE(FS) according to FIG. 3b in contrast comprises a file system area FS-Ar with a file system key FSK and with a file system area FS which is larger compared to the standard application area Std-App-Ar, with a file system starting point FS-S, here with a file system header FS-H, and with a file system application area FS-App-Ar with applications App1-App3 of independent users SSC1-SSC3. Thereby, all access rights ACi of the standard identification medium IM are disabled or deleted, so that the access to the complete file system area FS and to all applications may be effected directly via the file system key FSK. The previous access key area RK-Ar is thus also made available to applications.

In this example, the file system or the file system area FS is divided up into a file system header FS-H which lays down the organization of the file system area, and into a file system application area FS-App-Ar. The access to the applications App(RFS) is effected by the method steps 20-22: via the file system key FSK to the file system starting point FS-S or to the file system header FS-H and then to the applications App. The file system header FS-H thereby contains information IMI on the identification medium, such as manufacturer and memory size, if these are not present in the manufacturer's area Man, and on the file system FS such as file system version FSv, data organization, access rights aci and encryption functions cryp (according to the security requirements).

Here the file system starting point FS-S preferably lies in the file system header FS-H.

Depending on the desired organization of the applications and on their authorizations, one may prescribe that with the file system key FSK, one may only access the file system starting point FS-S or the file system header FS-H—and not the application area FS-App-Ar. Then e.g. an assigned key FSK-App may be introduced for an application and/or an independent user SSC, said key controlling the access to a corresponding application, in the example of FIG. 3b, e.g. to the application App1 (with the method steps 22a from FS-H to FSK-App, and 22b from FSK-App to App1).

A control indicator (flag) fl which indicates the initialization may be set in the identification medium IM(FS) as further information after writing the file system FS. One may also write in control conditions flc or initialization information fli:

Control conditions flc which e.g. define a number of accesses to the file system, or an expiry date, and initialization information fli which specify under what conditions, when, how, with which write/read station WR(RFS)-Ini and by way of whom an initialization of FS has been implemented.

The control condition flc or the initialization information fli e.g. also permit a flexible use of the application area FS-App-Ar. On writing-in the file system FS (initialization), although the complete application area FS-App-Ar is [data] written, however only a part of the area may be released for use (for writing-in) by a first user SSC1, which the user requires and for which he pays. This first user or a second independent user SSC2 then by way of post-writing-in (post-initialization), may obtain the release of a second part of the area for extending an existing application or for a new application. Thus e.g. one may do away with identification media with differently large memory areas (and accordingly differently large file system areas FS-Ar). An identification medium IM with a large memory area thus, with regard to the users SSC, may also be sold as an identification medium with a small memory area. The manufacturer or seller of identification media IM thus profits from the economies of scale for identification media IM with a large memory area, whilst the user SSC in comparison to identification media with a small memory area does not need to pay a greater price for an identification medium with a larger memory area, but only for the partly released applications area FS-App-Ar. The size of the released application area FS-App-Ar may be part of the information IMI. With the control condition flc or the initialization information fli, one may also define whether a post-writing-in is possible, or within which period of time and under which conditions this is possible.

A further security condition may be introduced by way of the fact that the user SSCi for writing-in and executing applications Appi may access the file system header FS-H only in a reading manner or only in a partly writing manner, e.g. for the one-time writing-in of an application-specific and user-specific access right aci, so that the user may not change or influence the organization of the file system FS, wherein this is only laid down by the system owner (on the uppermost hierarchical level). Compared to the access rights ACi of the standard identification media IM, the file system access rights aci have the same function, but advantageously they are organized in a flexible manner. This e.g. permits the definition of flexible keys or of access rights or complete rights management (in contrast to the fixed keys FSK-App), e.g. in the form of "stamps" for the access to an application Appi, which may be composed of the following parts:

from application-independent parts of the file system header FS-H, i.e. from parts which are given by the reference file system RFS or the rules ru(RFS) and/or the authorization system A, and may not be changed, from application-specific parts of the file system header FS-H such as e.g. access rights aci which may be written in once or several times, from application-specific parts (capable of being written in once or several times) of an application App in the application area FS-App-Ar, e.g. an application starting point App-S according to FIG. 3b.

An essential advantage of such a flexible key is the fact that no keys need to be exchanged between the write/read station and the identification media. It is stipulated according to the rules of the reference file system ru(RFS) as to what a write/read station WR(RFS) is to read out from an identification medium IM(FS) and is to be compared or evaluated as keys.

The rules ru(RFS) of the reference file system determine the configuration and the data structure as well as the access rights aci to the file system and to the applications or to the corresponding keys (stamps) determining them.

The specification of applications via a reference file system RFS or rules ru(RFS), in comparison to the stipulation with standard identification media, enables a virtual rights management RM independent of the identification medium, in the write/read station WR(RFS) based on the virtual addresses vAd of the reference file system RFS. Since only virtual addresses vAd or corresponding virtual lists Li (FIG. 6) are handled and managed in the write/read station WR(RFS) and not lists with physical addresses pAd of rights (keys), one may do a change of an application without the adaptation of the rights management RM, i.e. no updated lists with new physical addresses pAd need to be written into the read/write stations WR(RFS).

A further very essential advantage lies in the fact that by way of the rules ru(RFS) of the reference file system, one may ensure that independent applications App1, App2 which may not mutually influence one another, from independent users SSC1, SSC2, may be written into initialized standard identification media and executed, autonomously and independently of one another, i.e. independent applications may be freely specified, amended and written into any initialized identification media IM(FS) and also executed, by independent users independently of one another without any arrangement, and only fixed by the rules ru(RFS) of the reference file system. This is not possible with known standard identification media—there, one requires a coordination or agreement between different users with regard to the access authorizations.

The standard identification media required for writing in the file system FS may thereby be stipulated to the users SSCi or also be exclusively distributed, (centrally) by an uppermost hierarchical level which e.g. has authority over the control of the use of initialization write/read stations WR(RFS)-Ini. It is however also possible that a user SSCi sets a certain type of standard identification media for writing in the file system FS.

FIG. 3b as a further advantageous embodiment of the invention also shows the introduction of an application starting point App-S for the application App3 with the method steps 22c, 22d. On the basis of the reference file system RFS and its rules ru(RFS), also at least one application starting point App-S (implicitly as a virtual address or explicitly as a physical address) is defined with the initialization and stipulation of a file system starting point FS-S or by way of writing in a file system header FS-H. One may then write in and execute an application (and also find it) with regard to this application starting point App-S. As is illustrated in the example of FIG. 3b, with the method steps 20, 21, 22c, 22d, the access leads via the file system starting point FS-S or also via another location of a file system header FS-H to an application starting point App3-S for the application App3.

Figure 6:
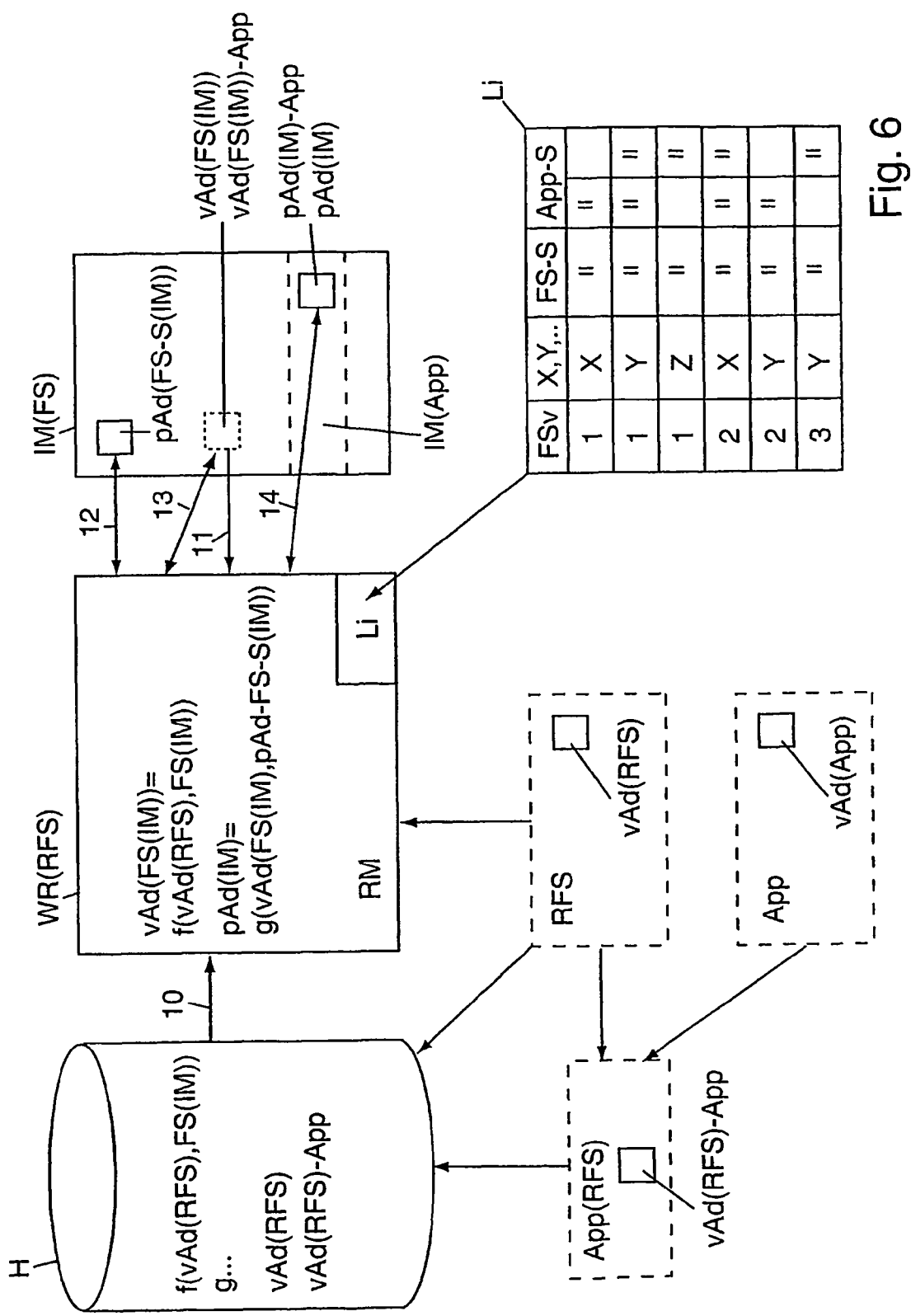

The possibility also exists of introducing a list of application starting points App-S in a file system header FS-H or in a selected write/read station WR(RFS) (as shown in FIG. 6). A direct (quicker) access to the application starting point and thus also to the applications is then possible, and the computation of the application starting points (e.g. from the type of application) need no longer be carried out. If for example, a first application start point App1-S of a first application App1 is determined with the initialization of the identification medium, then this may no longer be selected in the framework of the writing-in of a first application App1. For further applications App2, App3, their application starting points App2-S, App3-S may however also be stipulated with the writing-in of the application, and be adopted into a list of the application starting points (see FIG. 6). Applications written in with regard to an application starting point App-S may be privileged on execution, by way of accessing at first or directly, independently of how many applications have already been previously written in as the case may be.

Figure 4:
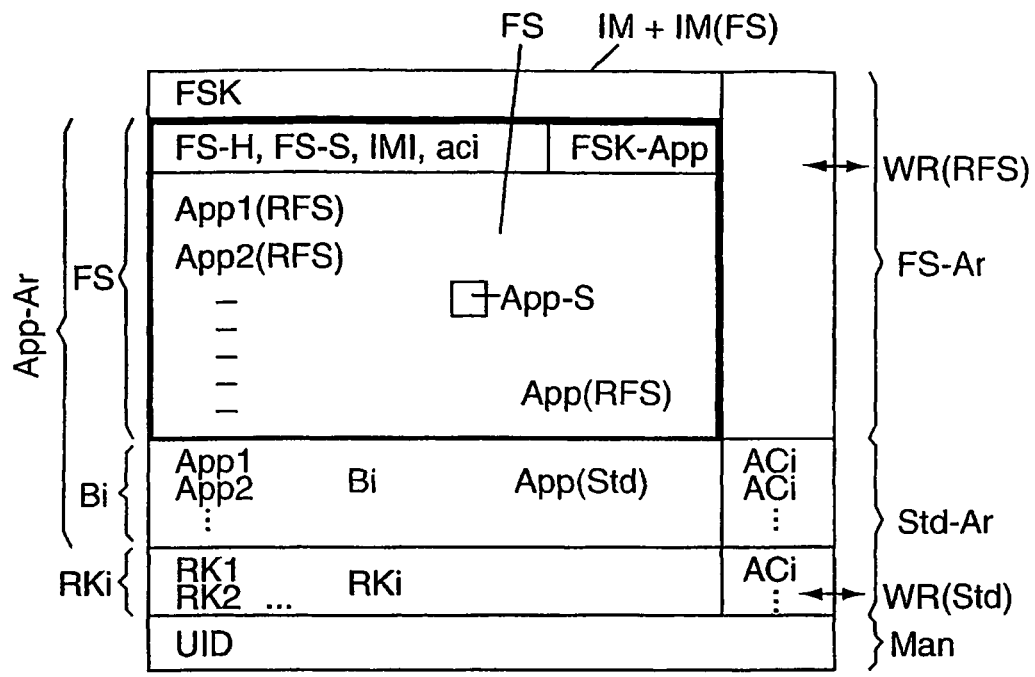
Figure 7:
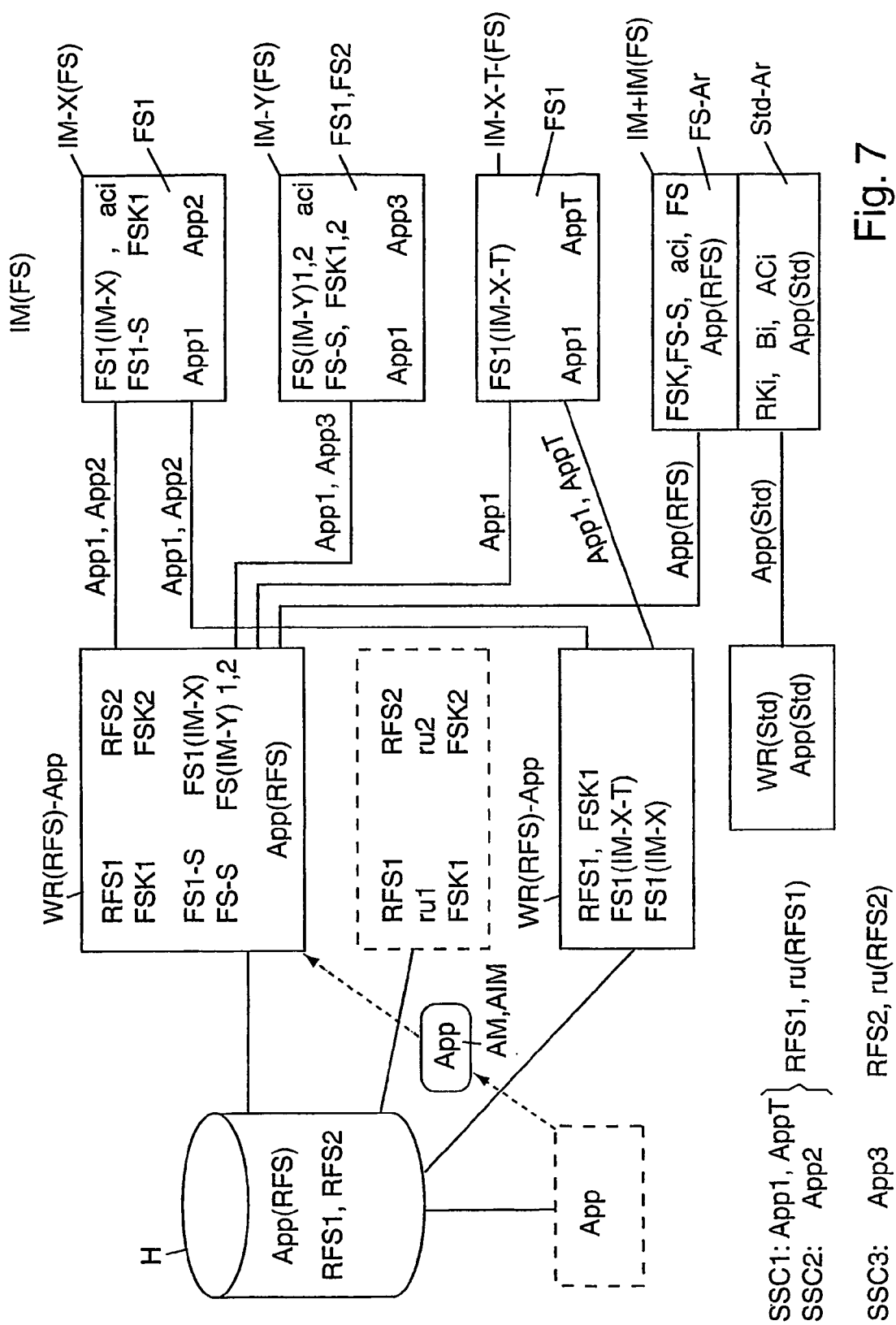

FIG. 4 shows an identification medium IM+IM(FS) which has a standard area Std-Ar with access keys RKi and access rights ACi for part areas Bi and with standard applications App(Std) of a known type, as well as also a file system area FS-Ar which contains applications App(RFS) corresponding to the reference file system. With this, such combined identification media IM+IM(FS) may be applied to previous standard applications App(Std) as well as for new applications App(RFS) according to the invention, in each case at corresponding write/read stations WR(Std) and WR(RFS) respectively. Thus new applications App(RFS) according to the invention, with corresponding assigned write/read stations and identification media, may be introduced in a communication system or an installation with existing known standard applications App(Std) as desired step by step and at any time. E.g. one and the same application during a transition time may be stored in an identification medium in the previous way and manner as App(Std) in the standard area Std-Ar, as well as in the form corresponding to the reference file system RFS as App(RFS) in the file system area FS-Ar. Accordingly, the application may be executed by way of a previous standard write/read station WR(Std) as well as by a new reference file system write/read station WR(RFS). Thus a previous standard system may be replaced in steps by a new RFS system. This is also shown in FIG. 7. Thereby, also such combined identification media IM+IM(FS) may be transferred into completely initialized identification media IM(FS) by way of the initialization of the standard area.

As already mentioned, the mutual independency of independent applications of independent users may be ensured with correspondingly configured rules ru(RFS) of the reference file system.

Figure 5:
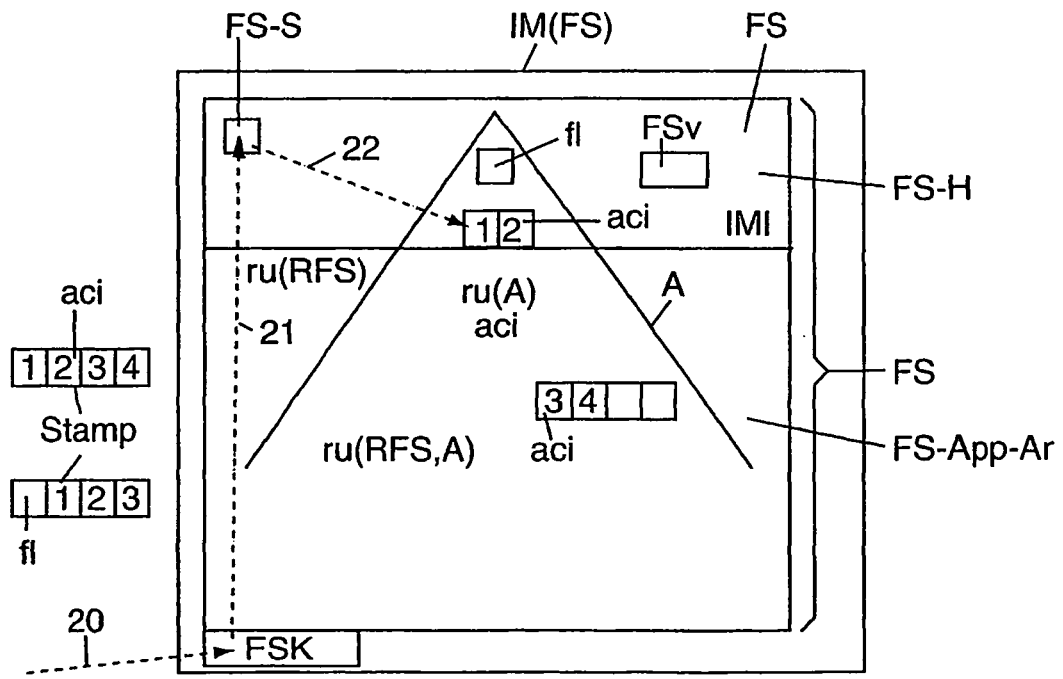

For this, a hierarchical authorization system A with rules ru(A) may also be introduced, as this for example is shown in FIG. 5. Thereby, by way of the combined rules ru(RFS, A) which correspond to the reference file system RFS and the authorization system A, one may ensure that different independent applications of various independent users may be realized in each case in an independent manner, and that they may not mutually influence one another.

Basically, the reference file system RFS for initializing identification media with a corresponding file system FS and the concept of a hierarchical authorization system A are independent of one another. A hierarchical authorization system A is disclosed for example in WO 97/34265, with the introduction of different organization levels, wherein the uppermost organization level is assigned to the system owner, and with which a stamp (which stipulates the access rights aci corresponding to the organization levels 1, 2, 3, 4) is introduced onto the identification media according to the desired applications.

Thereby, and as a combination of the two systems RFS and A, the reference file system may be superordinated, and the authorization system A may only be realized in the framework of the applications which are written in: RFS(A) as this corresponds to the shown example in FIG. 5. In this case e.g. also two different authorization systems may be subordinated to the reference file system RFS: RFS(A1, A2), e.g. an older and a newer authorization system.

Reversely, the authorization system A may also be placed above the reference file system: A(RFS) in that e.g. the file system key FSK or also the file system header FS-H is then dependent on A, e.g. in that the file system key FSK or parts of the file system header FS-H, as the control conditions flc or the initialization information fli, are assigned to organization levels of the system owner or of a user SSC. Thus hierarchical systems, amongst other things, may also be realized with the help of file system keys FSK.

Of course, independent users may also realize common applications if desired by both.

The access to an application via a stamp which stipulates the access rights aci on the organization levels 1, 2, 3, 4 assigned to the application is effected in the example of FIG. 5.

The access to the file system area FS or to the application area FS-App-Ar of the identification medium is determined here by the specifications and rules ru(A) of the hierarchical authorization system A.

FIG. 6 illustrates how the physical address pAd(IM) is determined and found in an identification medium IM(FS), proceeding from the virtual address vAd(FS(IM)) in the identification medium with regard to the file system FS(IM), and by way of the physical address of a reference point, preferably with the physical address pAd(FS-S(IN)) of the starting point FS-S as a reference address in the identification medium.

The linking of the addresses is defined by the functions f, g: the function f: vAd(FS(MI))=f(vAd(RFS), FS(IM)) links the virtual address vAd(RFS) of the reference file system RFS with the file system FS(IM) of the identification medium (this corresponds to the method steps 10 and 11), and the function g: pAd(IN)=g(vAd(FS(I)), pAd(FS-S(IM))) links the virtual address vAd(FS(IM)) in the identification medium IM with reference to the file system according to function f, and the physical address pAd(FS-S(IM)) of the starting point FS-S (corresponding to the method steps 12, 13, 14).

This searched physical address may be an address pAd(I) in the file system header FS-H or also an address pAd(IM)-App in the application area FS-App-Ar.

The functions f and g are preferably implemented in a write/read station WR(RFS) as f(WR(RFS)), g(WR(RFS)), wherein the logical intelligence, e.g. a microprocessor uP, lies in the write/read station WR. To supplement this or as an alternative, the functions f and g may also be executed in a host H as f(WR(RFS), H), g(WR(RFS), H) or f(H(RFS)), g(H(RFS)), wherein an online connection must exist between WR and H in the latter case. The identification medium normally serves as a memory for the data of the applications.

It is however also possible to execute the function g partly in the identification medium when it contains a suitable computation intelligence (a microprocessor uP), according to the function g (WR(RFS), IM(FS)).

Within the framework of the initialization of the file system in the identification media, the functions f and g are implemented for the file system key FSK, the file system starting point FS-S and/or a file system header FS-H.

Only on writing-in and execution of an application do the functions f and g encompass the complete file system FS including the application area FS-App-Ar.

The definition of an application (of the data structure and the meaning of the individual addresses) is effected as App (RFS) on the basis of the virtual addresses vAd(RFS) of the reference file system. An adaptation of an application to the physical or virtual addresses of identification media or to the file system FS(IM-X), FS(IM-Y) is no longer necessary, since this is effected automatically already with the initialization (the writing-in) of an identification medium IM with a file system FS(IM) and with the writing of an application into the corresponding identification medium.

FIG. 6 further shows that the addresses of application starting points App-S may be written in a file system header FS-H or in a selected write/read station WR(RFS), i.e. here in a list Li with preferably virtual addresses vAd. Applications may be executed in a more direct and rapid manner with such defined application starting points App-S.

FIG. 7 shows a communication system or an installation with a defined, virtual reference file system RFS independent of identification media, with initialized identification media IM(FS), with assigned write/read stations WR(RFS) as well as with applications App(RFS) which correspond to the reference file system RFS and its rules ru(RFS).

Here too, independent applications App1, App2, App3 by independent users SSC1, SSC2, SSC3 are represented for example, wherein more than one reference file system, here RFS1, RFS2, each with rules ru(RFS1), ru(RFS2) and with assigned keys FSK1, FSK2 are present These could also be different versions RFSv of a reference file system, e.g. an old and new version.

The applications App1, App2, AppT of the users SSC1 and SSC2 correspond to the reference file system RFS1, and the application App3 of the user SSC3 to the reference file system RFS2. These different applications may be executed via corresponding, assigned write/read stations WR(RFS-App) with corresponding assigned identification media IM(FS) which contain the applications. Two types of initialized identification media IM-X(FS) and IM-Y(FS) are represented, which in principle may contain any combinations of applications of corresponding reference file systems.

With the initialization of the file system FS in the identification media, it is also possible to limit these additionally to a certain type. E.g. such that with this, types of different users are initialized, thus a type T1 of user SSC1 and type T2 of user SSC2, i.e. that a type-dependent information is stipulated with the initialization. A function type may thereby e.g. consist of counting cards which lay down a number of use procedures, the operation period or an expiry date etc., preferably in dependency on a flag fl, a control condition flc and/or initialization information fli, i.e. as T(fl, flc, fli). Here, as an example, an identification medium IM-X-T(FS) is shown, which is limited to a certain type, here as a type of the user SSC1, and which is only to be accessible to him.

The applications may be written into the desired identification media or executed with these via a host H or also by way of authorization media AM or authorization identification media AIM via suitable write/read stations.

The communication system of FIG. 7 may yet also contain standard applications App(Std) with assigned standard write/read stations WR(Std). Here, an example of a combined identification medium IM+IM(FS) is shown, which contains a standard area Std-Ar with standard applications App(Std) as well as a file system area FS-Ar with applications App(RFS).

One may therefore realize communication systems with different industry standards and with RFS systems for a multitude of different applications.

Figure 8:
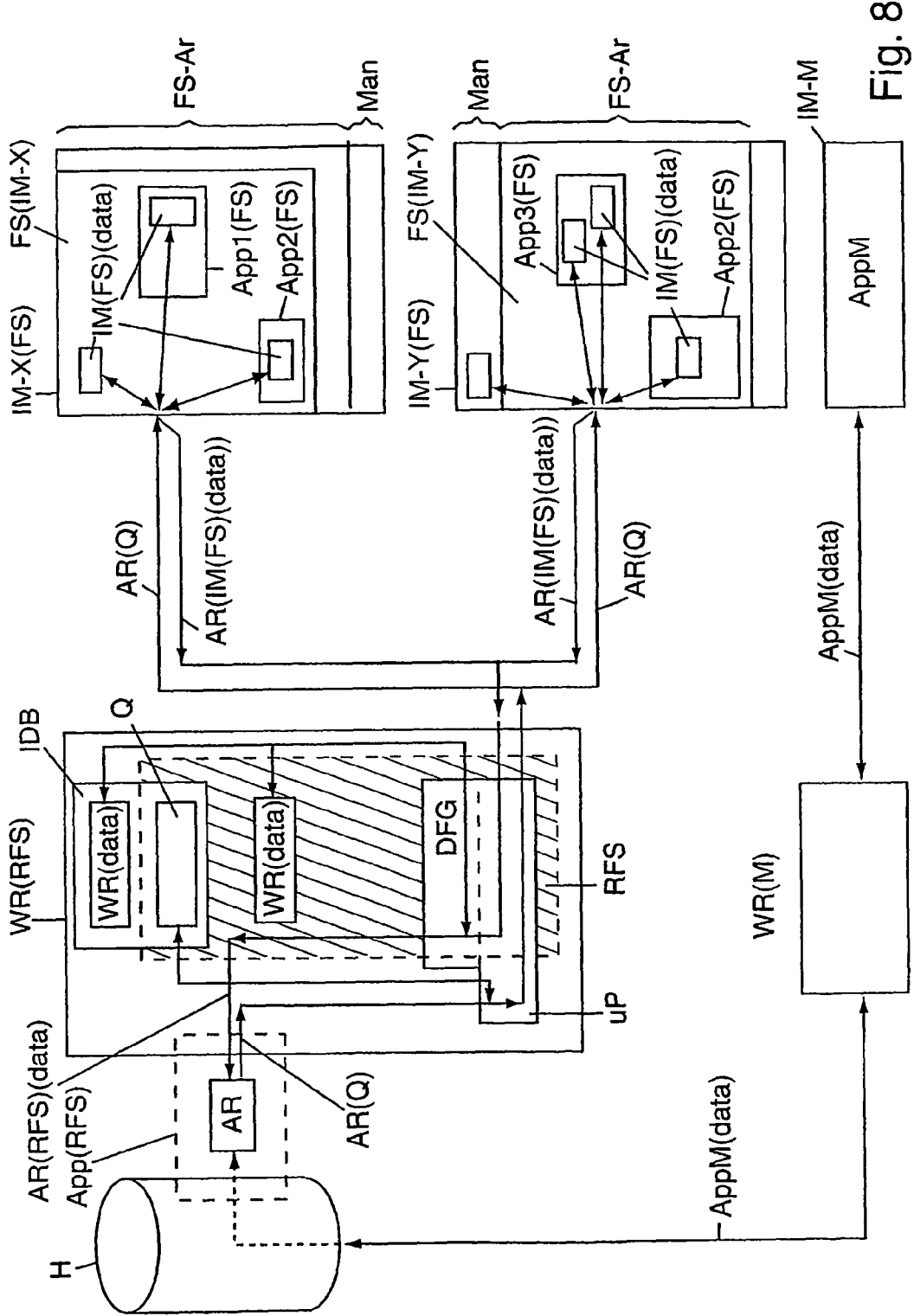

FIG. 8, as an advantageous further development of the invention, illustrates an automatic search and read function "auto read" AR with which, within the framework of the reference file system RFS, data (information) from identification media of a different type may be searched read out and composed into a response by way of a freely configurable data format generator DFG. This is effected in 3 steps:
1. Search of the desired information or data according to defined search criteria Q,
2. Reading the data and possible RFS conversion.
3. Composing the data in the desired format and output to an host interface.

For this, a search and read function auto read AR defined according to the reference file system RFS is defined and with which a search command AR(Q) according to search criteria Q for reading out certain, searched data from identification media (IM-X(FS)), IM-Y(FS) via a write/read station WR(RFS) may be set up, and wherein as a response, this searched data AR(IM(FS)(data)) is read out from the identification media and is processed in the write/read station into a data set AR(RFS)(data), which corresponds to the search command AR(Q).

This processing into a data set AR(RFS)(data) may preferably be effected by way of a data format generator DFG.

The data format generator DFG may form a part of the microprocessor uP of the write/read station WR or be integrated into this or it may form a separate component.

The searched data AR(IM(FS(data)) from the identification media may contain data from the manufacturer's area Man, and the response data set AR(RFS)(data) may also contain data WR(data) of the write/read station. The searched data IM(FS)(data) may encompass several applications (App1(FS), App2(FS)).

Data of the write/read station WR and parameters such as search criteria Q which define the auto read function AR may be contained in an information data base IDB. The search criteria Q may be freely configurable within the framework of the RFS or an application App(RFS). They may however also be stored in a preconfigured way in an information data base IDB in the write/read station WR(RFS), and be called up by the auto read function AR.

The searched data AR(IM(FS)(data)) in the identification media may encompass data from different applications (App1, App2, App3) from the file system area FS-Ar (e.g. access rights aci, flag fl) and from the manufacturer's area Man (e.g. UID). The complete response data set AR(RFS) (data) may also encompass data WR(data) from the WR.

As a further variant, FIG. 8 shows an additional proprietary system M which does not correspond to the RFS system, here e.g. a system with magnetic cards IM-M, magnetic card reader WR(M), applications AppM and with data AppM (data) (or analogously to this, e.g. also a system with Wiegand data format).

Response data sets AR(RFS)(data) which correspond to the AppM(data) may be generated with the search and read function AR and the data format generator DFG.

For this, the application AppM as a search command AR(Q, AppM) is integrated into the communication system with the reference file system RFS, without the application AppM having to be rewritten in a host. This permits a stepwise migration of such previous, proprietary systems (M) into an RFS communication system.

The automatic search and read function auto read AR, in principle, represents a special application App(RFS) according to the reference file system RFS.

Important advantages of the invention lie in the fact that standard identification media of different types according to various ISO standards, and from different manufacturers, which may all be uniformly used for applications defined according to the same universal reference file system, are available to the users. The same applications thus run on the different identification media without an adaptation to these media being required, as this was the case until now.

It also permits the users to be able to define, write in and execute these applications completely independently of one another. This permits a significant simplification and also an extension of the application possibilities.

The following references were used in the description:
1-8, 10-14, 20-22 method steps
IM identification media
IM-X, IM-Y standard IM of various type X, Y
IM(FS) IM with FS
RKi access keys
RK-Ar access area
ACi access rights
Bi parts areas, blocks
Man manufacturer's area
App-Ar application area
FS-Ar file system area
Std-Ar standard area
RFS, RFS1, RFS2 virtual reference file system
RFSv RFS version
FS file system according to RFS
FSv file system version
FSK file system key (access key)
FS(IM) file system in the identification medium
FS(IM-X), FS(IM-Y) file system according to IM-X, IM-Y
FS-S file system starting point
FS-S(IM-X), FS-S(IM-Y) file system starting point in corresponding IM
FS-H file system header
FS-App-Ar FS application area
Std-App-Ar standard application area
WR write/read station
WR(RFS) WR corresponding to the RFS
Ini, WApp, RApp functions of WR
RM rights management
App application
App(Std) standard application
App(RFS) application according to RFS
App-S application starting point
T, T1, T2, Ti types of IM(FS)
H background system, host
A authorization system
ru rules of RFS or A
aci access rights of RFS or A
fl flag, indicator
flc control conditions
fli initialization information
cryp encryption
SSC independent user
IMI information on IM and FS
UID unique identification number
vAd virtual address
pAd physical address
Li list with addresses
f, g functions in WR, H
AM authorization means, -code
AIM authorization-, identification media
AR search and read function (auto read)
AR(Q) search command
Q search criteria
DFG data format generator
AR(IM(FS)(data)) searched data from IM
WR(Data) data of WR
AR(RFS)(data) response data set
IDB information data base in WR
uP microprocessor in WR
IM-M, WR(M) identification media, read stations,
AppM, AppM(data) applications and data of systems without RFS

The invention claimed is:

1. A method utilizing at least one computer processor for writing data, via a write/read station, into identification media, the method comprising:

assigning the write/read station to the identification media, wherein a first identification medium IM-X being of a different medium type from a second identification medium IM-Y, and each identification medium comprises an application area App-Ar freely accessible to applications App, with a plurality of application access keys RKi, RKj, and a plurality of access rights ACi ACj for part areas Bi, Bj of the application area App-Ar, initializing a file system FS for each identification medium, which corresponds to a defined, virtual reference file system RFS which is independent of the identification medium, the initializing performed such that all of the plurality of access keys RKi, RKj are replaced by a file system key FSK of the assigned write/read station, and all of the plurality of access rights ACi, ACj of the part areas Bi, Bj are disabled, and subsequently, writing the file system FS, in accordance with a identification medium being initialized, into the part areas Bi of the first identification medium and into the part areas Bj of the second identification medium, and thereby defining a file system starting point in each of the first identification medium and the second identification medium, wherein the file system starting point being defined in the assigned write/read station corresponding to the virtual reference file system RFS, so that any applications App(RFS) defined according to the virtual reference file system RFS are written into each identification medium via the assigned write/read station, and executed subsequently to the writing being successful, the file system FS is divided into a file system header FS-H and into a file system application area FS-App-Ar, or that the file system starting point FS-S lies in the file system header FS-H, and with the file system key FSK, access is allowed only for the file system starting point FS-S or the file system header FS-H.

2. The method according to claim 1, wherein the virtual reference file system RFS comprises rules ru(RFS).

3. The method according to claim 2, wherein the rules of the virtual reference file system ru(RFS) correspond to a hierarchical authorization system A:ru(RFS, A).

4. The method according to claim 2, wherein the rules ru(RFS) of the virtual reference file system RFS ensure that independent users (SSC1, SSC2) write in and execute independent applications (App1, App2) which do not mutually influence one another, autonomously and independently of one another.

5. The method according to claim 1, wherein more than one virtual reference file system (RFS1, RFS2) with corresponding file system keys (FSK1, FSK2) and file system starting points (FS-S1, FS-S2) are applied or written in.

6. The method according to claim 1, wherein the identification media IM comprise each a file system area FS-Ar and a standard area Std-Ar with the plurality of access keys RKi and the plurality of access rights ACi for part areas Bi, Bj.

7. The method according to claim 1, wherein the access to the file system FS is effected via the file system starting point FS-S.

8. The method according to claim 1, wherein at least one application starting point App-S is defined in each of the identification media IM.

9. The method according to claim 8, wherein a first application starting point App-S1 is defined with definition of the file system starting point FS-S or with the writing in of the file system header FS-H.

10. The method according to claim 1, wherein a background system or host H or any write/read station WR(RFS) executes an application App(RFS) defined according to specifications of the virtual reference file system, on any identification media with the file system FS without adaptation to the identification medium.

11. The method according to claim 1, wherein the file system starting point (FS-S(IM-X), FS-S(IM-Y)) in the assigned write/read station is determined by recognizing the type of the identification medium (IM-X, IM-Y) and thus defined.

12. The method according to claim 1, wherein after the writing-in of the file system FS, a flag fl is set in each of the identification media or a control condition tic or initialization information fli is written in.

13. The method according to claim 12, wherein a size of the freely accessible or available application area FS-App-Ar is determined by the control condition tic or the initialization information fli.

14. The method according to claim 1, wherein a physical address pAd(IM) is determined in each of the identification media in the following manner:

from a virtual address vAd(FS(IM)) in the identification medium with reference to the file system FS, and from a physical address of the file system starting point pAd (FS-S(IM)) as a reference address in the identification medium.

15. The method according to claim 1, wherein the identification media IM are limited to a certain type (IM-X-T(FS)) with the initialization of the file system FS.

16. The method according to claim 15, wherein the limitation of the identification media IM to a certain type T is effected by a flag fl, a control condition tic or initialization information fli (T(fl, tic, fli) or that the identification media IM are initialized as a type of a certain user (T-SSC1, T-SSC2) or as function types being numbering cards which stipulate a number of accesses or the operational duration or also an expiry date.

17. The method according to claim 1, wherein a search and read function auto read AR defined according to the virtual reference file system RFS is defined, with which a search command AR(Q) according to search criteria Q for reading out certain searched data from identification media (IM-X (FS), IM-Y(FS)) via any write/read station WR(RFS) is created, and wherein this searched data AR(IM(FS)(data)) is read out of the identification media as a response, and in the write/read station is processed into a response data set AR(RFS)(data) by way of a data format generator DFG, the response data set corresponding to the search command AR(Q).

18. The method according to claim 17, wherein the searched data AR(IM(FS)(data)) from the identification media also contains data from the manufacturer's area Man and that the response data set AR(RFS)(data) also contains data WR(data) of the write/read station.

19. The method according to claim 17, wherein the searched data IM(FS)(data) encompasses several applications (Appl(FS), App2(FS)).

20. A non-transitory identification medium configured to be written into and read from by an assigned write/read WR station, the identification medium incorporating an application area App-Ar freely accessible to applications App, with a plurality of access keys RKi and a plurality of access rights ACi for part areas Bi of the application area App-Ar, the identification medium comprising:

a file system FS which corresponds to a defined, virtual reference file system RFS independent of the identification medium, wherein all of the plurality of access keys RKi are replaced by a file system key FSK of the assigned write/read WR station, and all of the plurality of access rights ACi of the part areas Bi are disabled, and the file system FS, in accordance with the identification medium, is written into the identification medium, and thereby a file system starting point is defined in the identification medium, wherein the file system starting point being defined in the assigned write/read station corresponding to the virtual reference file system RFS, so that applications App(RFS) defined according to the virtual reference file system RFS are written into the identification medium via the assigned write/read station and executed subsequently to the writing being successful, the file system FS is divided into a file system header FS-H and into a file system application area FS-App-Ar, or that the file system starting point FS-S lies in the file system header FS-H, and with the file system key FSK, access is allowed only for the file system starting point FS-S or the file system header FS-H.

21. A communication system including at least one computer processor and one computer memory comprising the defined virtual reference file system RFS independent of identification media, with at least one identification medium according to claim 20, with assigned write/read stations WR(RFS) and with applications App(RFS) which correspond to the virtual reference file system RFS.

* * * * *

UNITED STATES PATENT AND TRADEMARK OFFICE
CERTIFICATE OF CORRECTION

PATENT NO. : 8,554,795 B2
APPLICATION NO. : 10/578217
DATED : October 8, 2013
INVENTOR(S) : Plüss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Fifteenth Day of September, 2015

Michelle K. Lee
*Director of the United States Patent and Trademark Office*